(12) United States Patent
Mattsson

(10) Patent No.: US 9,659,068 B1
(45) Date of Patent: May 23, 2017

(54) METHODS AND SYSTEMS FOR PROVIDING MEDIA RECOMMENDATIONS BASED ON IMPLICIT USER BEHAVIOR

(71) Applicant: Spotify AB, Stockholm (SE)

(72) Inventor: Andreas Mattsson, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/070,343

(22) Filed: Mar. 15, 2016

(51) Int. Cl.
*G06F 7/00* (2006.01)
*G06F 17/30* (2006.01)
*H04L 29/08* (2006.01)
*H04W 4/04* (2009.01)

(52) U.S. Cl.
CPC .... *G06F 17/3053* (2013.01); *G06F 17/30053* (2013.01); *G06F 17/30766* (2013.01); *G06F 17/30867* (2013.01); *H04L 67/306* (2013.01); *H04W 4/046* (2013.01)

(58) Field of Classification Search
None
See application file for complete search history.

(56) References Cited

U.S. PATENT DOCUMENTS

| | | | | |
|---|---|---|---|---|
| 8,856,051 B1 * | 10/2014 | Song | ................... | G06N 99/005 706/12 |
| 2009/0163183 A1 * | 6/2009 | O'Donoghue | ......... | G06Q 30/02 455/414.1 |
| 2010/0169153 A1 * | 7/2010 | Hwacinski | ............. | G06Q 30/02 705/7.31 |
| 2010/0185671 A1 * | 7/2010 | Burba | ............... | G06F 17/30766 707/780 |
| 2015/0347416 A1 * | 12/2015 | Lin | .................... | H04N 21/2187 707/751 |
| 2015/0370818 A1 * | 12/2015 | Des Jardins | ...... | G06F 17/30029 707/734 |

OTHER PUBLICATIONS

TunA (TUNA: socializing music sharing on the move, 2006 Spring).*

* cited by examiner

*Primary Examiner* — Uyen Le
(74) *Attorney, Agent, or Firm* — Morgan, Lewis & Bockius LLP

(57) ABSTRACT

Methods and systems for providing media recommendations based on implicit user behavior are described herein. In one aspect, a server system provides a first media item for playback based on a request from an application executing on an electronic device. Data associated with a behavior of a first user of the content service is received. The received data and the behavior implicitly correspond to the playback of the first media item and do not correspond to an explicit user input to the application for controlling playback of or providing feedback for the first media item. The server system uses the received data to provide a media recommendation to the electronic device.

10 Claims, 10 Drawing Sheets

METHODS AND SYSTEMS FOR PROVIDING MEDIA RECOMMENDATIONS BASED ON IMPLICIT USER BEHAVIOR

TECHNICAL FIELD

The disclosed implementations relate generally to media playback, and, in particular, to providing media recommendations based on implicit user behavior.

BACKGROUND

Access to electronic media, such as music and video content, has expanded dramatically over time. As a departure from physical media, media content providers stream media to electronic devices across wireless networks, improving the convenience with which users can digest and experience such content.

As part of the service they provide and to assist users in discovering new content, media content providers track and process user data in an attempt to understand user preferences, and ultimately to provide relevant recommendations. While users can specify their preferences by providing explicit user inputs, such as by "liking" content or adding content to a custom playlist, media content providers often fail to identify or utilize other non-explicit indicators of user preference.

SUMMARY

Accordingly, there is a need for systems and methods for providing media recommendations based at least in part on implicit user behavior. By using data associated with user behavior that implicitly corresponds to media playback, which data and user behavior exclude explicit user inputs for a media item (e.g., user inputs for controlling playback or providing user feedback), content providers are able to provide media recommendations that are more likely to be relevant to a user. Such systems and methods optionally complement or replace conventional methods for providing media recommendations.

In accordance with some implementations, a method is performed at a server system (e.g., a media content provider) having one or more processors and memory storing instructions for execution by the one or more processors. The server system provides a content service. The method includes providing a first media item for playback based on a request from an application executing on an electronic device. Data associated with a behavior of a first user of the content service is received. The received data and the behavior implicitly correspond to the playback of the first media item and do not correspond to an explicit user input to the application for controlling playback of or providing feedback for the first media item. The server system uses the received data, alone or in conjunction with other data, to provide a media recommendation to the electronic device.

In accordance with some implementations, a server system includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the server system, cause the server system to perform the operations of the method described above.

Thus, systems are provided with effective methods for providing media recommendations to users of a content service.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first media item could be termed a second media item, and, similarly, a second media item could be termed a first media item, without departing from the scope of the various described implementations. The first media item and the second media item are both media items, but they are not the same media item.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
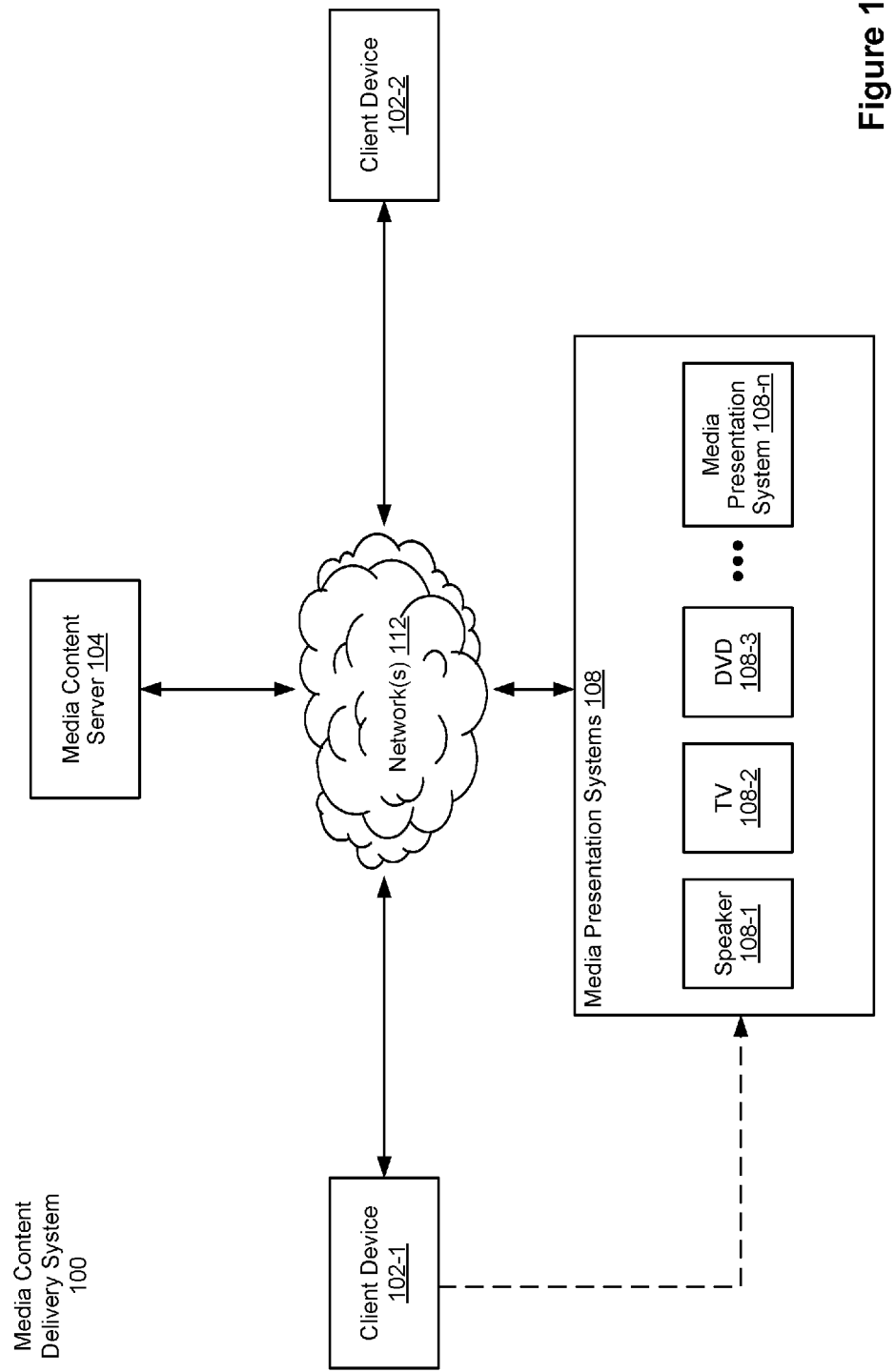
FIG. 1 is a block diagram illustrating a media content delivery system in accordance with some implementations.

FIG. 1 is a block diagram illustrating a media content delivery system 100 in accordance with some implementations. The media content delivery system 100 includes one or more client devices 102 (e.g., client device 102-1 and client device 102-2), one or more media content servers 104, and one or more media presentation systems 108, including speaker 108-1, television (TV) 108-2, digital versatile disk (DVD) player 108-3, and/or other media presentation system 108-$n$ (where n is an integer greater than three). One or more networks 112 communicably couple the components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device 102-1 or 102-2 is associated with one or more users. In some implementations, a client device is a personal computer, mobile electronic device, wearable computing device, laptop computer, tablet computer, mobile phone, feature phone, smart phone, digital media player, or any other electronic device capable of presenting media content (e.g., controlling playback of media items, such as music tracks, videos, etc.). In some implementations, client devices 102-1 and 102-2 are the same type of device (e.g., client device 102-1 and client device 102-2 are both mobile devices). Alternatively, client device 102-1 and client device 102-2 are different types of devices.

In some implementations, client devices 102-1 and 102-2 send and receive media-control information through the networks 112. For example, client devices 102-1 and 102-2 send media control requests (e.g., requests to play music, movies, videos, or other media items, or playlists thereof) to media content server 104 through network(s) 112. Additionally, client devices 102-1 and 102-2, in some implementations, also receive authentication tokens from the media content server 104 through network(s) 112.

In some implementations, client device 102-1 communicates directly with media presentation systems 108. As pictured in FIG. 1, client device 102-1 is able to communicate directly (e.g., through a wired connection or through a short-range wireless signal, such as those associated with BLUETOOTH/BLE communication technologies, radio-frequency-based near-field communication technologies, infrared communication technologies, etc.) with media presentation systems 108, while client device 102-2 communicates with the media presentation systems 108 through network(s) 112. In some implementations, client device 102-1 uses the direct connection with media presentation systems 108 to stream content (e.g., data for media items) for playback on the media presentation systems 108.

In some implementations, client device 102-1 and client device 102-2 each include a media application 222 (FIG. 2) that allows a user of the client device to browse, request (e.g., for playback at the client device 102 and/or a media presentation system 108), and/or present media content (e.g., control playback of music tracks, videos, etc.). Media content may be stored locally (e.g., in memory 212 of the client device 102, FIG. 2) and/or received in a data stream (e.g., from the media content server 104). The media presentation system 108 is part of the client device 102, such as built-in speakers and/or a screen, or separate from the client device 102, such as a wirelessly coupled speaker (e.g., speaker 108-1).

In some implementations, the media content server 104 stores and provides media content (also referred to as media items) (e.g., media content requested by the media application 222 of client device 102-1 and/or 102-2) to client devices 102 and/or media presentation systems 108 via the network(s) 112. Content stored and served by the media content server 104, in some implementations, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-$n$) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some implementations, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Figure 2:
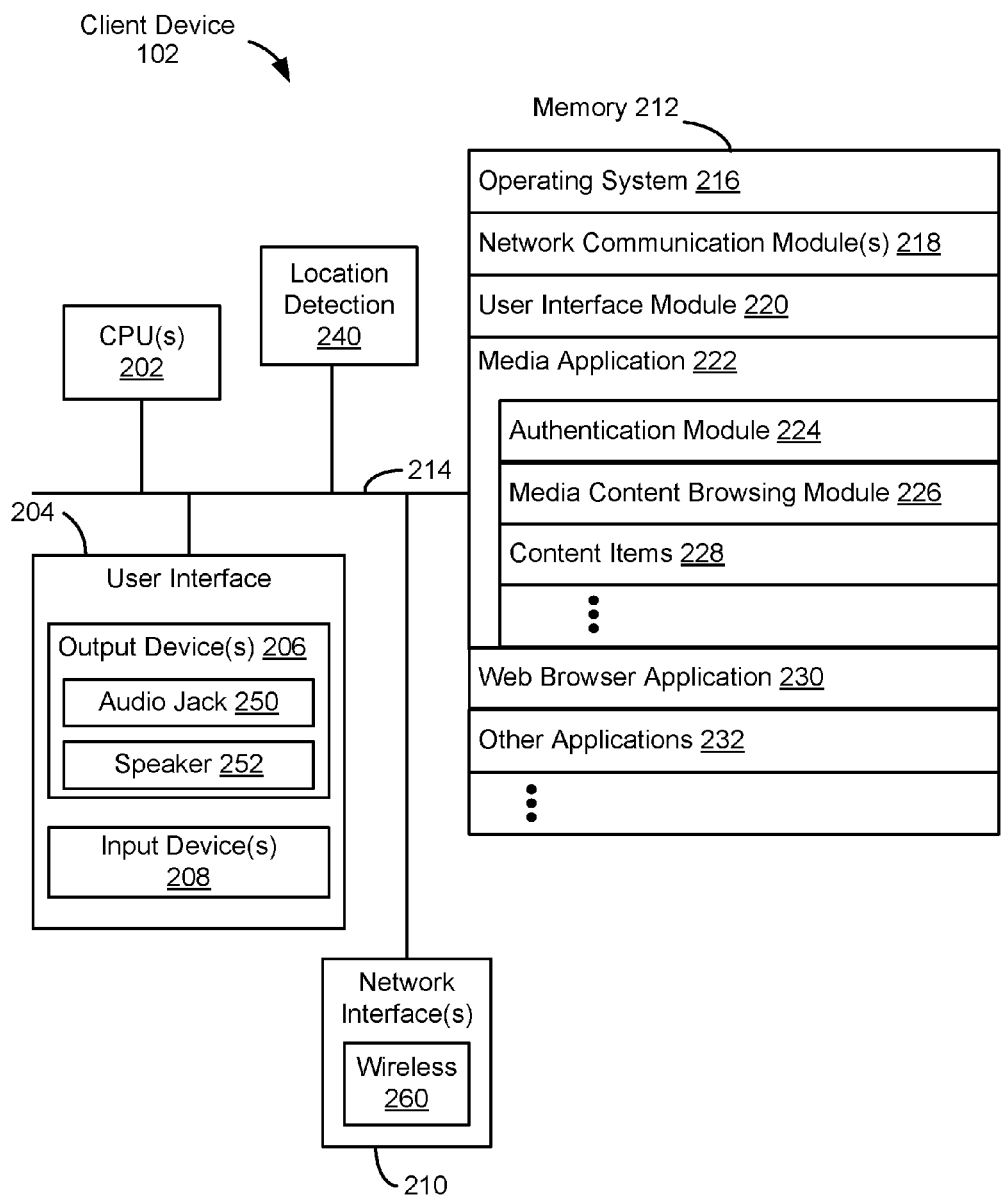
FIG. 2 is a block diagram illustrating a client device in accordance with some implementations.

FIG. 2 is a block diagram illustrating a client device 102 (e.g., client device 102-1 and/or client device 102-2, FIG. 1) in accordance with some implementations. The client device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client device 102 includes a user interface 204, including output device(s) 206 and input device(s) 208. In some implementations, the input devices include a keyboard, mouse, or track pad. Alternatively, or in addition, in some implementations, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 206) include a speaker 252 (e.g., speakerphone device) and/or an audio jack 250 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 240, such as a GPS (global positioning satellite) or other geo-location receiver, and/or location-detection software for determining the location of the client device 102 (e.g., module for finding a position of the client device 102 using trilateration of measured signal strengths for nearby devices).

In some implementations, the one or more network interfaces 210 include wireless and/or wired interfaces for receiving data from and/or transmitting data to other client devices 102, media presentations systems 108, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 210 include a wireless interface 260 for enabling wireless data communications with other client devices 102, media presentations systems 108, and/or or other Bluetooth-compatible devices (e.g., for streaming audio data to the media presentations system 108 of an automobile). Furthermore, in some implementations, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some implementations, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the client device 102 to other computing devices (e.g., media presentation systems 108, media content server 104, and/or other client devices) via the one or more network interface(s) 210 (wired or wireless) connected to one or more network(s) 112 such as the Internet, other WANs, LANs, PANs, MANs, VPNs, peer-to-peer networks, content delivery networks, ad-hoc connections, and so on;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application associated with and for accessing a content service provided by a media content provider such as media content server 104, including a media player, a streaming media application, or any other appropriate application or component of an application) for browsing, receiving, processing, presenting, and requesting playback of media (e.g., media items). The media application 222 is also used to monitor, store, and/or transmit (e.g., to media content server 104) data associated with user behavior, both explicit (e.g., explicit user inputs to the media application 222 for controlling playback of or providing feedback for media items) and implicit (e.g., behavior implicitly corresponding to media-item playback, which excludes explicit user behavior such as user inputs for controlling media-item playback). The media application 222 also includes the following modules (or sets of instructions), or a subset or superset thereof:
  - an authentication module 224 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;
  - a media content browsing module 226 for providing controls and/or user interfaces enabling a user to navigate, select for playback, and otherwise control or interact with media content, whether the media content is stored or played locally or remotely;
  - a content items module 228 storing media items for playback;
- a web browser application 230 (e.g., Internet Explorer by Microsoft, Firefox by Mozilla, Safari by Apple, or Chrome by Google) for accessing, viewing, and interacting with web sites; and
- other applications 232, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media presentation system 108 is a type of client device 102, and includes some or all of the same components, modules, and sub-modules as described above in FIG. 2 with respect to the client device 102.

Figure 3:
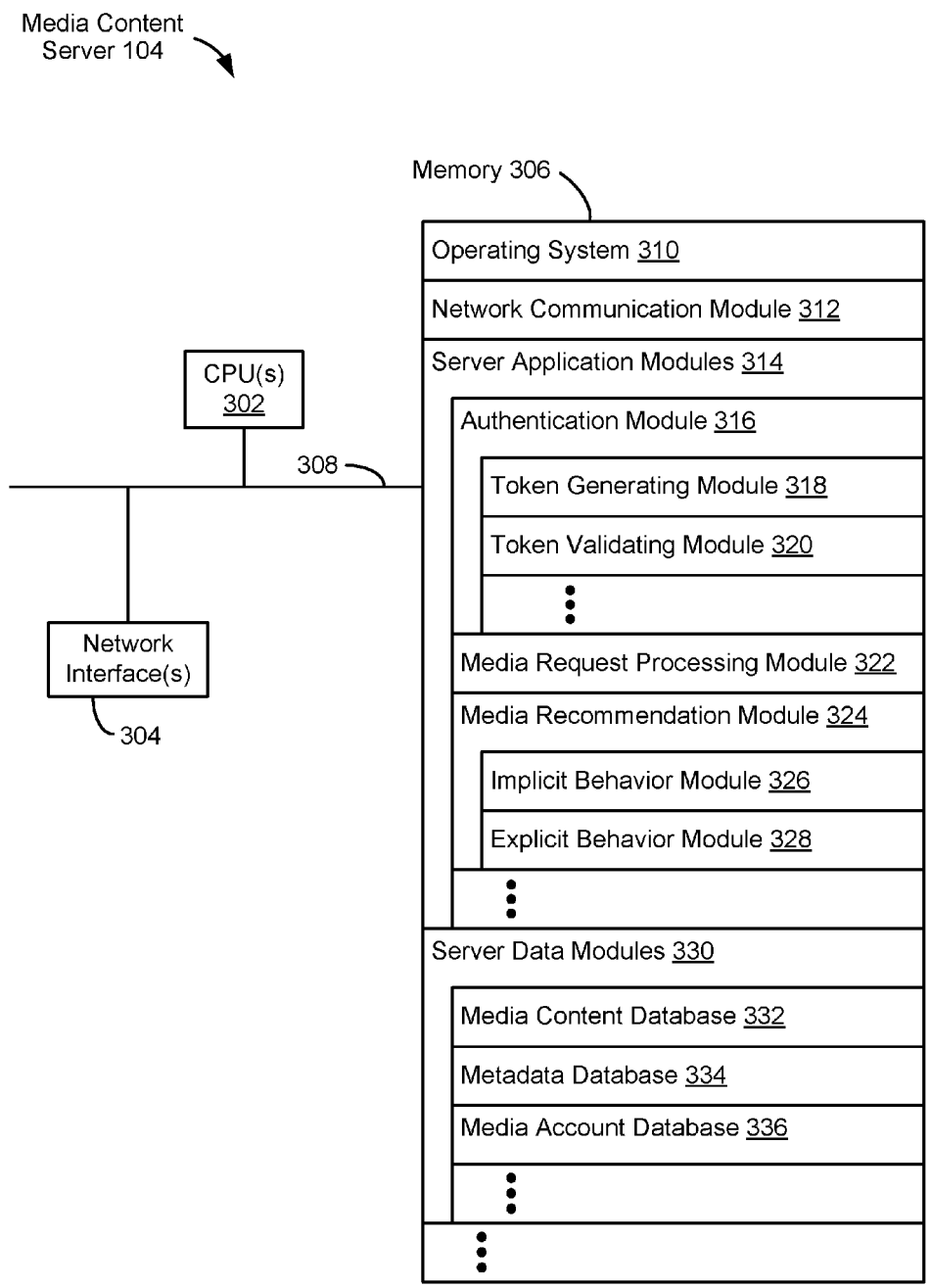
FIG. 3 is a block diagram illustrating a media content server in accordance with some implementations.

FIG. 3 is a block diagram illustrating a media content server 104 in accordance with some implementations. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:
- an operating system 310 that includes procedures for handling various basic system services and for performing hardware dependent tasks;
- a network communication module 312 that is used for connecting the media content server 104 to other computing devices via one or more network interfaces 304 (wired or wireless) connected to one or more networks 112 such as the Internet, other WANs, LANs, PANs, MANs, VPNs, peer-to-peer networks, content delivery networks, ad-hoc connections, and so on;
- one or more server application modules 314 for performing various functions with respect to providing and managing a content service, the server application modules 314 including, but not limited to, one or more of:
  - an authentication module 316 for managing authentication and/or authorization requests, the authentication module 316 including, but not limited to, one or more of:
    - a token generating module 318 for generating authentication tokens permitting use of media presentation systems 108; and
    - a token validating module 320 for verifying that an authentication token is valid (e.g., has not yet expired or has not yet been revoked); and
  - a media request processing module 322 for processing requests for media content and facilitating access to requested media items by client devices (e.g., the client device 102) including, optionally, streaming media content to such devices and/or to one or more media presentation systems 108;
  - a media recommendation module 324 for providing media recommendations (e.g., suggested media items, artists, songs, genres, stations, etc.) to users of the content service (e.g., based on received data associated with user behavior), including, but not limited to, one or more of:
    - an implicit behavior module 326 for using, processing, and storing data associated with implicit user behavior (e.g., user behavior with implicitly corresponding to playback of media items, which excludes explicit user behavior such as user inputs for controlling media-item playback) in providing a media recommendation; and
    - an explicit behavior module 328 for using, processing, and storing data associated with explicit user behavior (e.g., explicit user inputs to the media application 222 for controlling playback of or providing feedback for media items) in providing a media recommendation;
- one or more server data module(s) 330 for handling the storage of and access to media items and metadata relating to the media items; in some implementations, the one or more server data module(s) 330 include:
  - a media content database 332 for storing media items (e.g., audio files, video files, text files, etc.);
  - a metadata database 334 for storing metadata relating to the media items; and
  - a media account database 336 for storing account information for user media accounts, including user profiles, credentials (e.g., user identifiers, passwords, email addresses, etc.), credentials or identifiers of any linked accounts, and the like.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some implementations, FIG. 3 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

FIGS. 4A-4G are flow diagrams illustrating methods 400-A (FIGS. 4A-4B), 400-B (FIGS. 4C-4D), 400-C (FIGS. 4E-4F), and 400-D (FIG. 4G) for providing media recommendations using data associated with implicit user behavior, in accordance with some implementations. The methods 400-A through 400-D are performed (402) at a server system (e.g., media content server 104, FIGS. 1 and 3) having one or more processors and memory storing instructions for execution by the one or more processors. The server system provides a content service, (e.g., provides media content for playback to client devices 102 and/or media presentation systems 108 in a media content delivery system 100). In some implementations, the methods 400-A through 400-D are performed by executing instructions stored in the memory of a server system (e.g., in memory 306, FIG. 3).

The methods 400-A through 400-D describe various implementations in which data associated with user behavior is used to provide media recommendations. In providing a content service, the server system provides media items for playback to client devices and/or media presentation systems of the media content delivery system. By using data associated with user behavior that implicitly corresponds to media playback (as opposed to explicit user inputs for a media item), content service providers can infer user preferences or opinions with respect to media items being played, and may therefore provide media recommendations (e.g., suggested media items, artists, genres, stations, etc.) more likely to be of interest to users.

In some implementations, stages from different ones of the methods 400-A through 400-D may be combined (e.g., performed in parallel with, in addition to, alternatively to, and/or simultaneously with each other). Therefore, stages of the methods 400-A through 400-D may be combined to form other methods. For example, the received data in step 412 of the method 400-A (which indicates movement from within an automobile to outside of an automobile) and the received data in step 446 of the method 400-C (which indicates that playback of a media item is through the speaker) may both be used to provide a media recommendation.

Figure 4A:
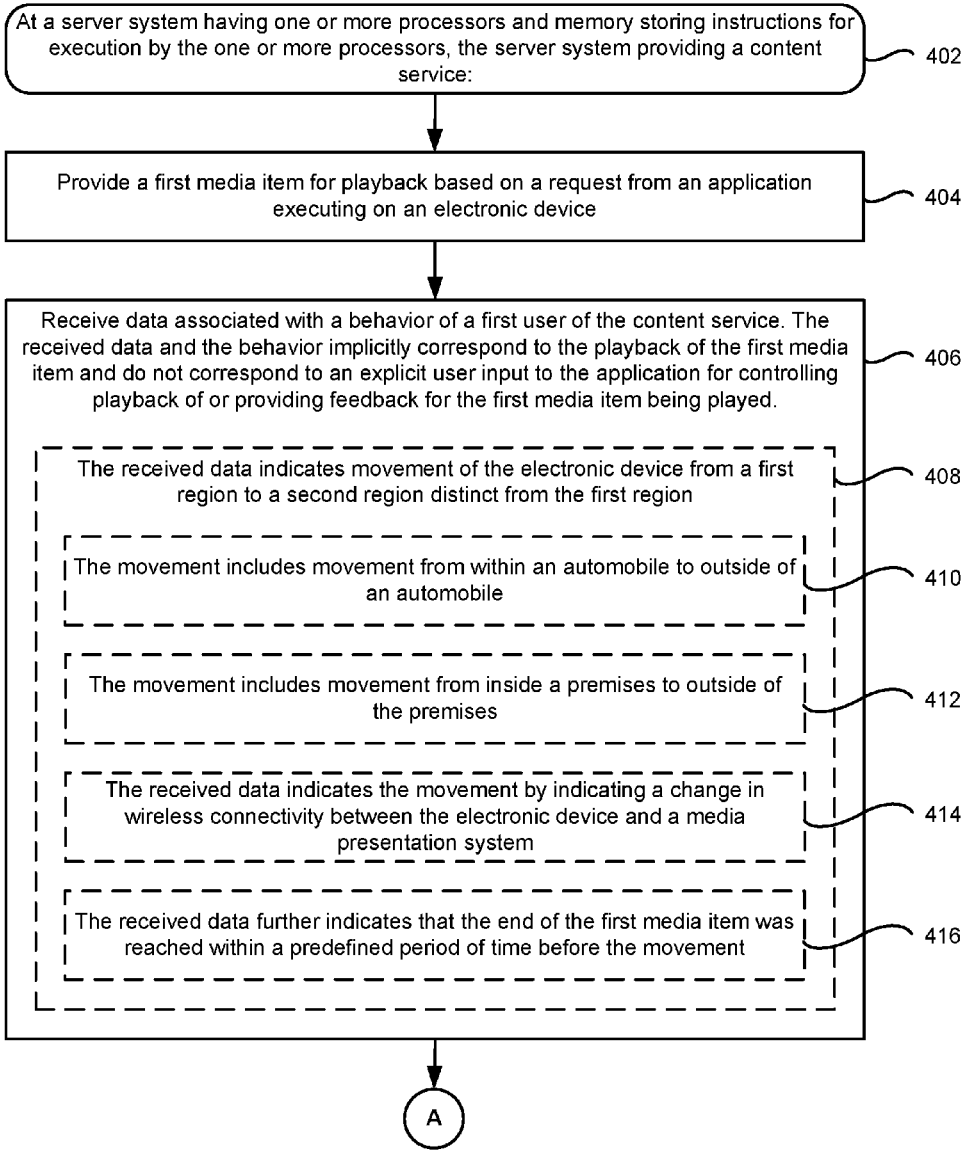
FIGS. 4A-4G are flow diagrams illustrating methods for providing media recommendations in accordance with some implementations.

Referring now to FIG. 4A, in performing the method 400-A, the server system provides (404) a first media item for playback based on a request from an application executing on an electronic device. As an example (referring to FIG. 1), the client device 102-1 sends a request for a music track to the media content server 104, and in response, the media content server 104 provides the requested media to the client device 102-1 or media presentation system(s) 108 for playback (e.g., streams audio data for the requested music track).

The server system receives (406) data associated with a behavior of a first user of the content service. The received data and the behavior implicitly correspond to the playback of the first media item and do not correspond to an explicit user input to the application (e.g., media application 222, FIG. 2) for controlling playback of or providing feedback for the first media item. Explicit user inputs to the application for controlling playback include, for example, inputs selecting play, stop, pause, fast forward, rewind, next track, previous track, and/or other inputs, commands, or instructions for manipulating playback of a media item. Explicit user inputs to the application for providing feedback include, for example, inputs for liking, commenting on, marking as favorite, bookmarking, sharing, adding to a playlist, and/or other inputs, commands, or instructions for expressly indicating a user's preference for (e.g., opinion of) a media item.

Media recommendations (and sometimes a user preference with respect to a media item) may be based on movements of an electronic device between regions (e.g., exiting a car or building) with respect to playback of media items. For example, a recommendation is based (at least in part) on a comparison of the timing of the movement to the timing of the playback.

In some implementations, the received data indicates (408) movement of the electronic device from a first region to a second region distinct from the first region. A region may correspond to a specific set of coordinates (e.g., GPS coordinates), a geo-fence (e.g., a virtual perimeter corresponding to a predefined geographic area), a predefined environment (e.g., home, office, retail store, etc.), or other defined region. In some implementations, the movement includes (410) movement from within an automobile to outside of an automobile (e.g., a user exiting an automobile). In some implementations, the movement includes (412) movement from inside a premises to outside of the premises (e.g., a user leaving a home). In some implementations, the received data indicates (414) the movement by indicating a change in wireless connectivity between the electronic device and a media presentation system (e.g., in FIG. 1, movement corresponding to a user leaving a home environment is detected based on a client device 102-1 being communicably disconnected (e.g., Bluetooth connection lost) from a media presentation system 108). In some implementations, the received data indicates the movement by indicating a loss of wireless connectivity for the electronic device (e.g., loss of a connection to a wireless network such as a wireless local area network (WLAN)).

In some implementations, the received data further indicates a timing of the movement with respect to playback of the first media item (e.g., timing indicated by a timestamp, a flag corresponding to movement occurring before/after finishing playback, etc.). In some implementations, the received data further indicates (416) that the end of the first media item was reached within a predefined period of time before the movement. As an example, the received data may indicate that a user consumed a media item (e.g., listened to a song) while situated in the first region, and then exited the first region after reaching the end of the media item (e.g., song). This data suggests that the user stayed in the first region to finish the media item (e.g., hear the entire song) and thus likes the media item. The predefined period of time before the movement (416) may be used as a threshold for distinguishing trivial behavior (i.e., behavior from which no user preference can be inferred, whether positive or negative) and movements (with respect to finishing playback of a media item) from which user preference can be inferred. For example, a user leaving a premises very shortly after a song finishes (e.g., after 10 seconds) is more likely an indicator of positive user preference than a user leaving the premises a substantial amount of time after the song finishes (e.g., an hour after). Alternatively, in some implementations, the received data indicates that the movement occurred before the end of the first media item was reached (e.g., user left a premises before playback of a music track was completed). This data does not imply a positive user preference for the media item and may imply either no preference or a negative user preference for the media item.

Figure 4B:
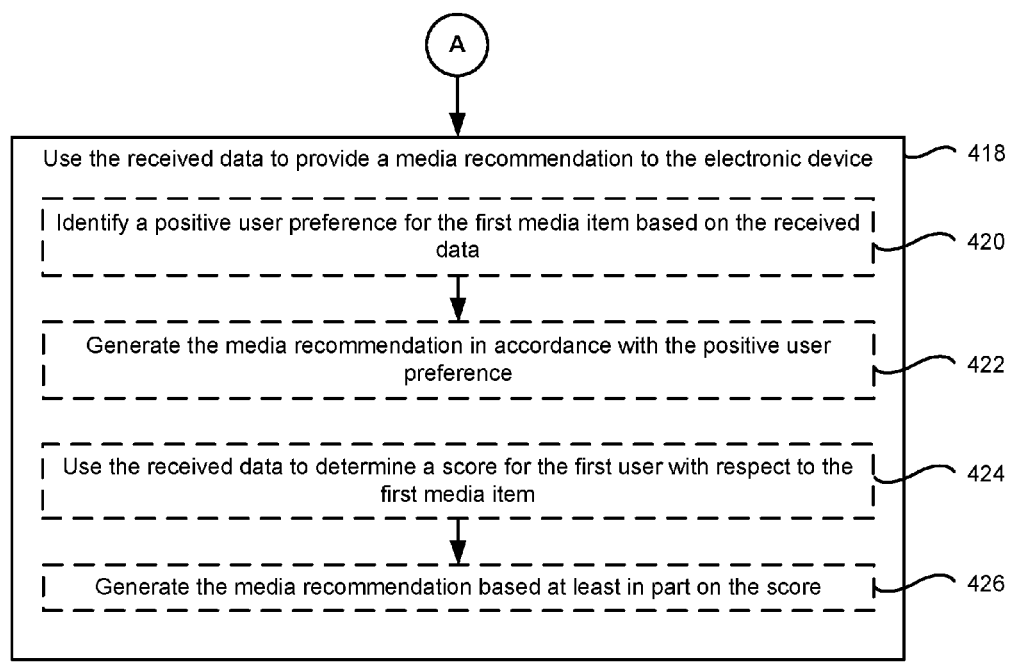

Referring to FIG. 4B, the server system uses (418) the received data to provide a media recommendation to the electronic device. The received data provides a basis for inferring a user's opinions, feelings, or preferences (positive or negative, or neither) with respect to various aspects of a particular media item, such as musical characteristics of the media item (e.g., preference for music having a same key, tempo, etc.), associated artists (e.g., preference for the composer/singer/producer, similar artists, etc.), associated albums/playlists (e.g., preference for an album/playlist from which the media item was played), associated categories (e.g., preference for music of the same genre, time period, etc.), and/or other associated properties of the media item.

Using these inferences, media recommendations (e.g., suggestions and/or automatic queueing of tracks, artists, genres, stations, etc.) are determined and provided to the electronic device. Media recommendations are based at least in part on the received data, and in some cases are also based on one or more other factors or data for providing a media recommendation (e.g., in providing the media recommendation, data corresponding to explicit user inputs, previous user activity, information specified in a user profile, etc., are used in combination with the received data implicitly corresponding to the playback of the first media item).

In some implementations, using (418) the received data to provide the media recommendation includes identifying (420) a positive user preference for the first media item based on the received data, and generating (422) the media recommendation in accordance with the positive user preference. In some implementations, identifying (420) the positive user preference includes increasing a score (e.g., score for the user, the score being associated with one or more aspects of the first media item, such as a score associated with an artist or genre of the first media item). In one example, the received data may indicate that the end of the first media item was reached within a predefined period of time before moving from within the first region to outside of the first region (416, FIG. 4B). A user waiting for a song to finish before exiting a car tends to suggest that the user prefers to hear a song through to completion rather than interrupt the listening experience, and thus the user has positive feelings towards the particular song (and/or other aspects of the song, such as the song's artists, associated genre, etc.). In accordance with the positive user preference, a media recommendation is provided (e.g., recommend songs by the same/similar artists, other songs from the same album, etc.).

In other implementations, a negative user preference is identified for the first media item based on the received data. In some implementations, identifying the negative user preference includes decreasing a score (e.g., score for the user, the score being associated with one or more aspects of the first media item, such as a score associated with an artist or genre of the first media item). As an example, the received data may indicate that the movement occurred before the end of the first media item was reached. Here, a user leaving the car before finishing a track in playback tends to suggest that the user prefers to interrupt or terminate the listening experience rather than hear a song through to completion, therefore suggesting that the user has negative feelings towards the particular song (and/or other aspects of the song). In accordance with the negative user preference, a corresponding media recommendation is provided (e.g., songs by different artists, songs from a different album, etc.).

In some implementations, the received data is used (424) to determine a score (e.g., numerical value of a range of possible numerical values, a binary value, etc.) for the first user with respect to the first media item, and the media recommendation is generated (426) based at least in part on the score. The score may be based on one or a combination of different indications provided by the received data (e.g., movement from inside a premises to outside of the premises may correspond to a higher score than movement from within an automobile to outside of an automobile; movement from a first to a second region that occurs sooner after the end of playback corresponds to a higher score than such movement occurring later).

Figure 4C:
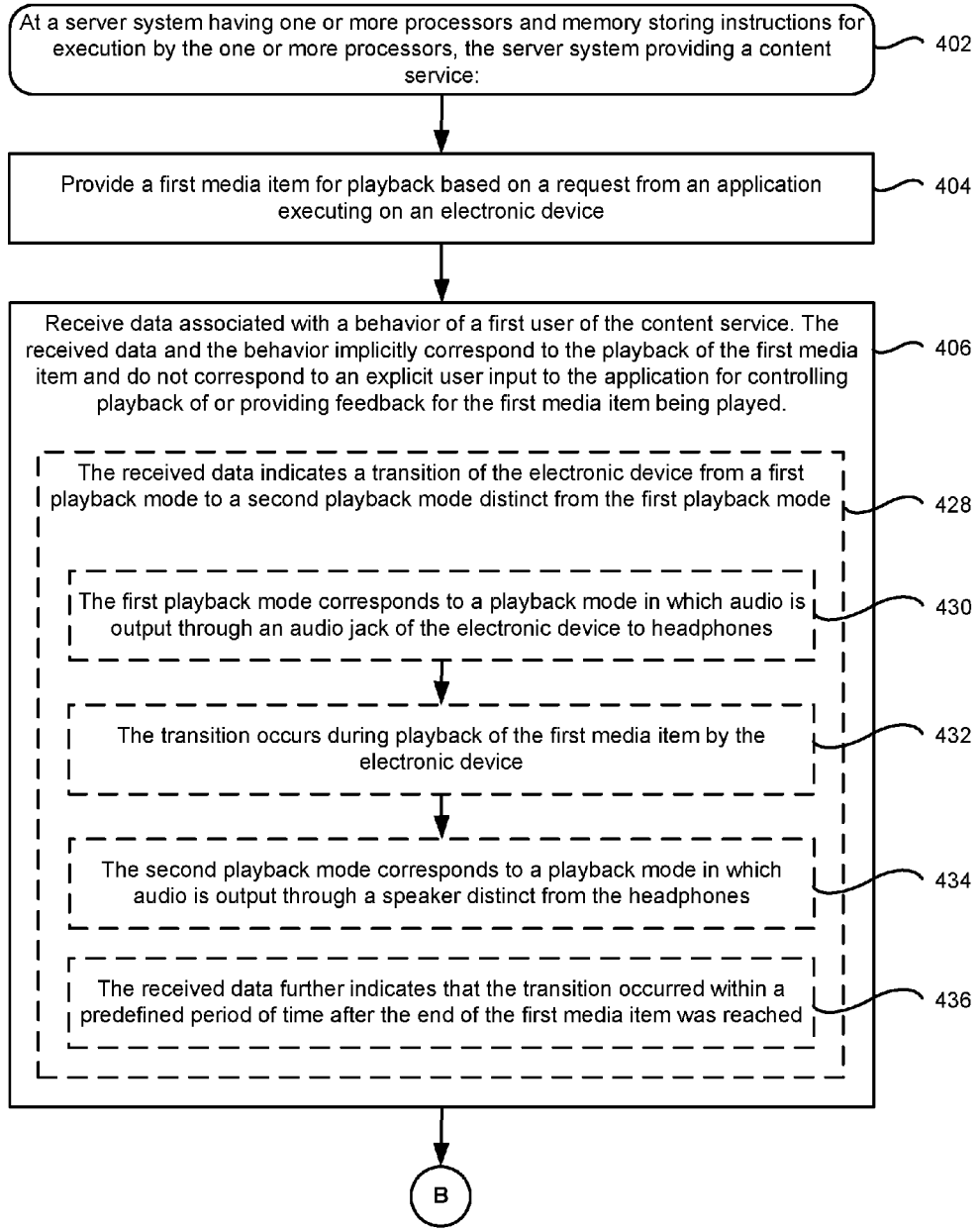

Referring now to FIG. 4C, in performing the method 400-B, a first media item is provided (404) for playback based on a request from an application executing on an electronic device (where providing the first media item for playback is performed in accordance with any of the implementations discussed with respect to any of the other methods 400-A through 400-D).

The server system receives (406) data associated with a behavior of a first user of the content service. Receiving (406) the data is performed in accordance with any of the implementations discussed with respect to any of the other methods 400-A through 400-D.

Media recommendations (and sometimes a user preference with respect to a media item) may be based on transitions of electronic devices between playback modes (e.g., listening through headphones or using a speaker), and other aspects thereof (e.g., timing of the transition with respect to media playback).

The received data indicates (428) a transition of the electronic device from a first playback mode to a second playback mode distinct from the first playback mode. In some implementations, a respective playback mode is defined by an output through which media items (e.g., audio/video) are presented to a user (and/or others in proximity to, or in communication with, the user). The output may be an output device of an electronic device (e.g., audio jack 250, wireless interface 260 (e.g., Bluetooth, Wi-Fi), etc., FIG. 2), an audio component (e.g., on-board audio chipset of output device 206), a listening device/system coupled to the electronic device (e.g., headphones, speaker 252, media presentation system 108 (of a home, automobile, etc.)), and/or a remote audio device/system distinct from the electronic device and associated with a different user (e.g., client device 102-1 shares media for playback on client device 102-2). The transition from one playback mode to another may result from a user unplugging a listening device (e.g., unplugging headphones from the audio jack 250, which automatically switches to outputting audio through speaker 252), or from a user changing a setting of the electronic device (e.g., establishing Bluetooth connection between the client device 102 and a media presentation system 108, and thereby switching from audio being output through the audio jack 250 to outputting audio through the media presentation system 108).

In some implementations, the received data further indicates a timing of the transition with respect to playback of the first media item (e.g., timing indicated by a timestamp, a flag corresponding to transition occurring before/after finishing playback, etc.). For example, the first playback mode corresponds (430) to a playback mode in which audio is output through an audio jack of the electronic device to headphones (e.g., audio jack 250, FIG. 2). The transition of the electronic device from the first playback mode to the second playback mode occurs (432) during playback of the first media item by the electronic device, where the second playback mode corresponds (434) to a playback mode in which audio is output through a speaker distinct from the headphones (e.g., audio output through speaker 252 of the client device 102 or played on a media presentation system 108). In another example, the received data further indicates (436) that the transition occurred within a predefined period of time after the end of the first media item was reached (e.g., user finishes playback of a song using headphones before switching to a playback mode using a speaker where others in proximity could listen).

Figure 4D:
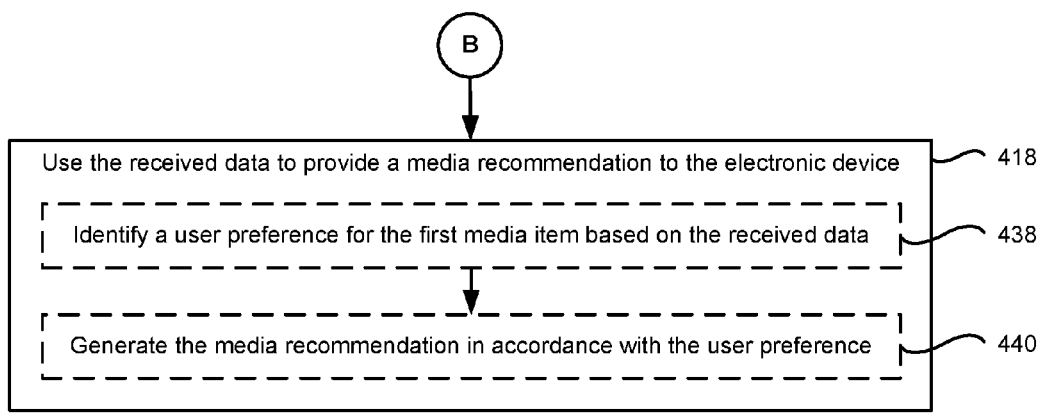

Referring to FIG. 4D, the server system uses (418) the received data to provide a media recommendation to the electronic device (where providing the media recommendation is performed in accordance with any of the implementations discussed with respect to any of the other methods 400-A through 400-D).

In some implementations, using (418) the received data to provide the media recommendation includes identifying (438) a user preference for the first media item based on the received data, and generating (440) the media recommendation in accordance with the user preference. As previously described, user preferences may be positive or negative (or neither/neutral) with respect to various aspects of a particular media item (e.g., musical characteristics of the media item, associated artists, associated albums/playlists, associated categories, and/or other associated properties of the media item). For example, the received data may indicate that the transition of the electronic device from the first playback mode to the second playback mode occurred during playback of the first media item by the electronic device (steps 430 through 434, FIG. 4C) (e.g., before finishing a song, transitioning from listening through headphones to listening through a speakerphone). In this example, a user switching from listening in a mode in which only the user can hear a particular song, to a mode in which others can also hear the song before it finishes, tends to suggest that the user intended to share the song for others to hear together. This may indicate a positive user preference (e.g., the user wanted to share a song that the user likes) or a negative user preference (e.g., the user wanted to share the song for the purposes of collective ridicule). Whether the user preference is positive or negative, a corresponding media recommendation is provided (e.g., if positive, recommend songs by the same/similar artists; if negative, recommend songs from a different genre/artist).

In a different example, the transition from a first playback mode to a second playback mode occurs within a predefined period of time after the end of the first media item was reached (step 436, FIG. 4C). Here, a user waiting to finish playback of a song using a personal listening device (e.g., headphones) before switching modes could suggest that a user did not want to interrupt the listening experience because the user has an affinity for the song (and/or other aspects of the song, such as the song's artists, associated genre, etc.). A media recommendation is provided accordingly (e.g., recommend songs by the same/similar artists).

Figure 4E:
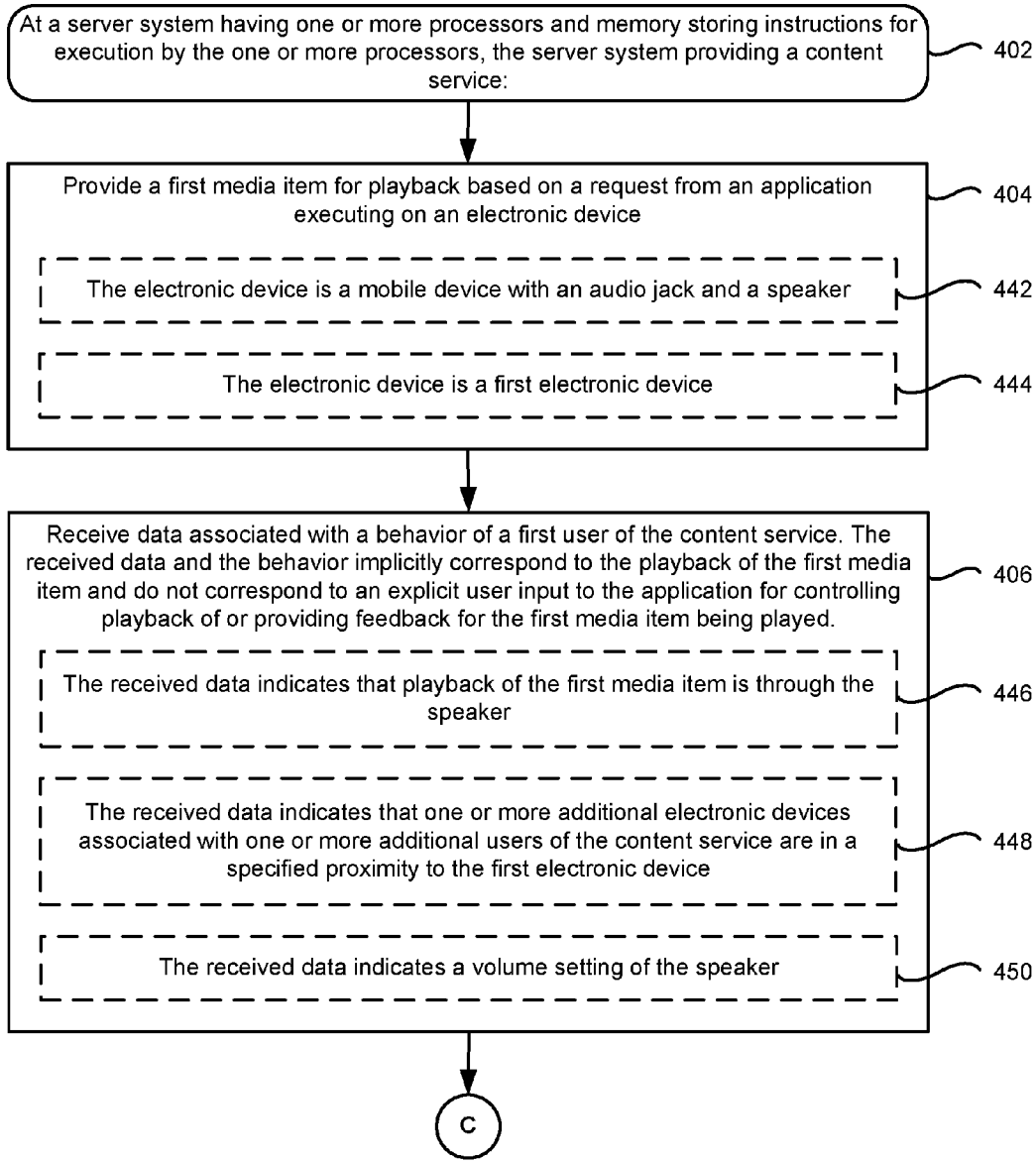

Referring now to FIG. 4E, in performing the method 400-C, a first media item is provided (404) for playback based on a request from an application executing on an electronic device (where providing the first media item for playback is performed in accordance with any of the implementations discussed with respect to any of the other methods 400-A through 400-D). In some implementations, the electronic device is (442) a mobile device (e.g., client device 102, FIG. 2) with an audio jack and a speaker (e.g., audio jack 250 and speaker 252, FIG. 2). In some implementations, the electronic device is (444) a first electronic device (e.g., client device 102-1, FIG. 1).

The server system receives (406) data associated with a behavior of a first user of the content service. Receiving (406) the data is performed in accordance with any of the implementations discussed with respect to any of the other methods 400-A through 400-D.

As described below, media recommendations (and sometimes a user preference with respect to a media item) are based on various aspects of media-item playback with respect to its presentation (e.g., through speakers, for presentation to multiple users in proximity, volume, etc.).

In some implementations, the received data indicates (446) that playback of the first media item is through the speaker (e.g., speaker 252, FIG. 2). In some implementations, the received data indicates (448) that one or more additional electronic devices associated with one or more additional users of the content service (e.g., client device 102-2) are in a specified proximity to the first electronic device (e.g., a specified distance, a region corresponding to a set of coordinates, a geo-fence, a predefined environment, etc., the proximity sufficient to indicate that the playback of media is intended to be heard by others). In some implementations, the one or more additional electronic devices are devices (e.g., with the media application 222) that are connected to the same network as the electronic device (e.g., client device 102-1 and client device 102-2 are connected to the same Wi-Fi network 112 and are therefore within a specified proximity). In some implementations, the received data indicates (450) a volume setting of the speaker. The data of steps 446, 448, and/or 450 may be combined in the received data.

Figure 4F:
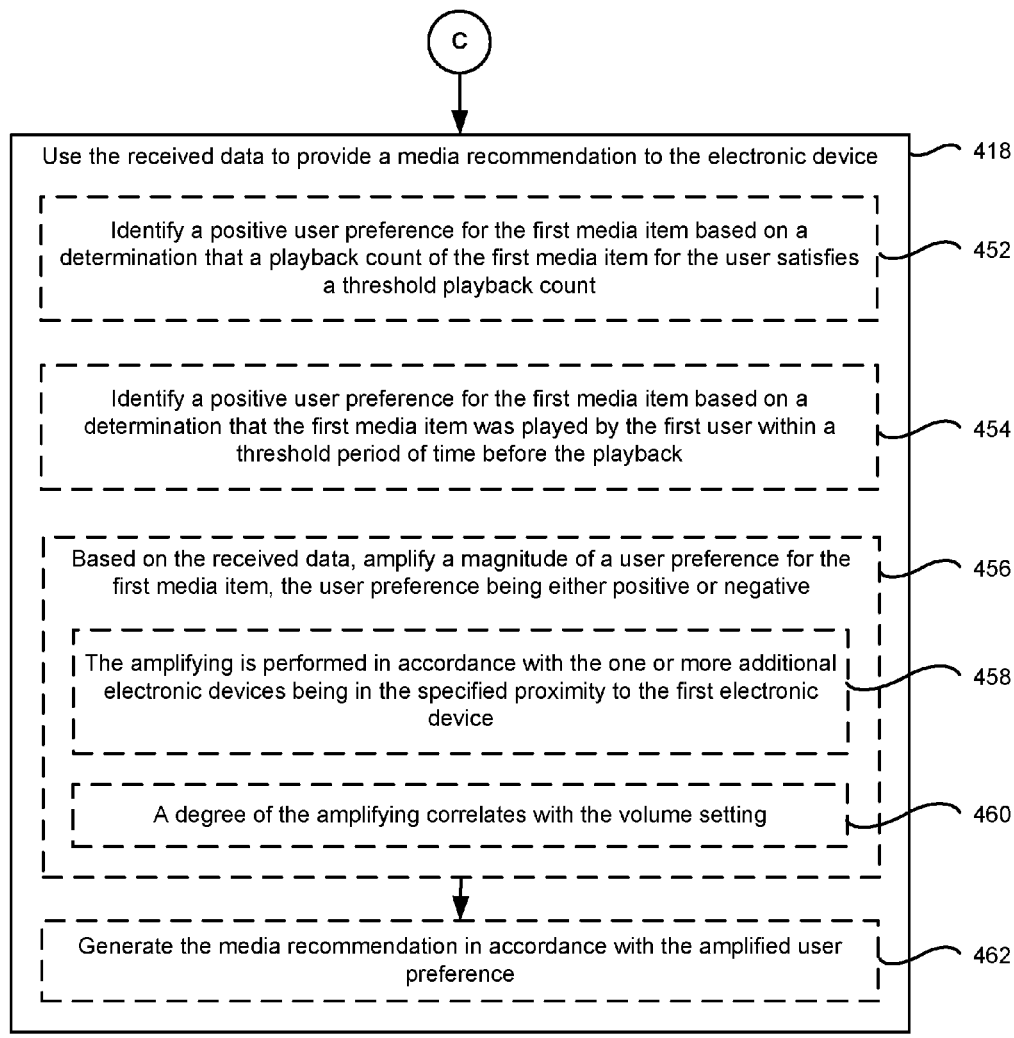

Referring to FIG. 4F, the server system uses (418) the received data to provide a media recommendation to the electronic device (where providing the media recommendation is performed in accordance with any of the implementations discussed with respect to any of the other methods 400-A through 400-D).

In some implementations, using (418) the received data to provide the media recommendation includes identifying a user preference for the first media item based on the received data, and generating the media recommendation in accordance with the user preference. As previously described, user preferences may be positive or negative (or neither) with respect to various aspects of a particular media item (e.g., musical characteristics of the media item, associated artists, associated albums/playlists, associated categories, and/or other associated properties of the media item). For example, if the received data indicates that playback of the first media item is through the speaker (step 446, FIG. 4E), it may indicate a positive user preference if the user personally enjoys listening to music through speakers more than listening through headphones. Moreover, if the received data also indicates that additional electronic devices associated with additional users are in a specified proximity to the first electronic device (step 448, FIG. 4E), it may indicate a positive user preference if the user wants to share a song the user likes, or alternatively, it may indicate a negative user preference if the user wants to share the song for the purposes of collective ridicule. A volume setting of the speaker indicated by the received data may also suggest a positive or negative user preference (or neither). For example, increased volume corresponds to increased preference, and vice-versa.

In some implementations, a positive user preference is identified (452) for the first media item based on a determination that a playback count of the first media item for the user satisfies a threshold playback count. The threshold playback count may be used to identify, bolster, or affirm an inference of either positive or negative user preference towards a media item. For example, the fact that a user listens to a particular song multiple times before playing it for his peers might suggest that the user has a positive opinion towards the song, whereas a user listening to the particular song only once before playing it for his peers might not, or might suggest the opposite.

In some implementations, a positive user preference is identified (454) for the first media item based on a determination that the first media item was played by the first user within a threshold period of time before the playback. The threshold period of time before the playback may be used to identify, bolster, or affirm an inference of either positive or negative user preference towards a media item. For example, if a user plays a song for his peers only shortly after having listened to it previously, it tends to suggest a user's eagerness to share the song with others, which may indicate either a positive or negative user preference.

As described above, in some cases, neither a positive nor negative user preference is inferred from the received data. In these implementations, a magnitude of a user preference for the first media item is amplified (456) based on the received data, the user preference (e.g., a previously identified user preference) being either positive or negative. The media recommendation is generated (462) in accordance with the amplified user preference. The magnitude of the user preference being amplified may have been previously determined using one or more other factors or data for providing a media recommendation (e.g., explicit user inputs, previous user activity, a user profile, etc.).

In some implementations, the amplifying is performed (458) in accordance with the one or more additional electronic devices being in the specified proximity to the first electronic device (e.g., other client devices being within the same room as the client device 102-1). In some implementations, a degree of the amplifying is based on a number of the one or more additional electronic devices within the specified proximity to the first electronic device (e.g., a degree of amplification increases with an increase in the number of additional electronic devices within the specified proximity). In some implementations, a degree of the amplifying correlates (460) with the volume setting (e.g., a degree of amplification increases with an increase in the volume level).

Figure 4G:
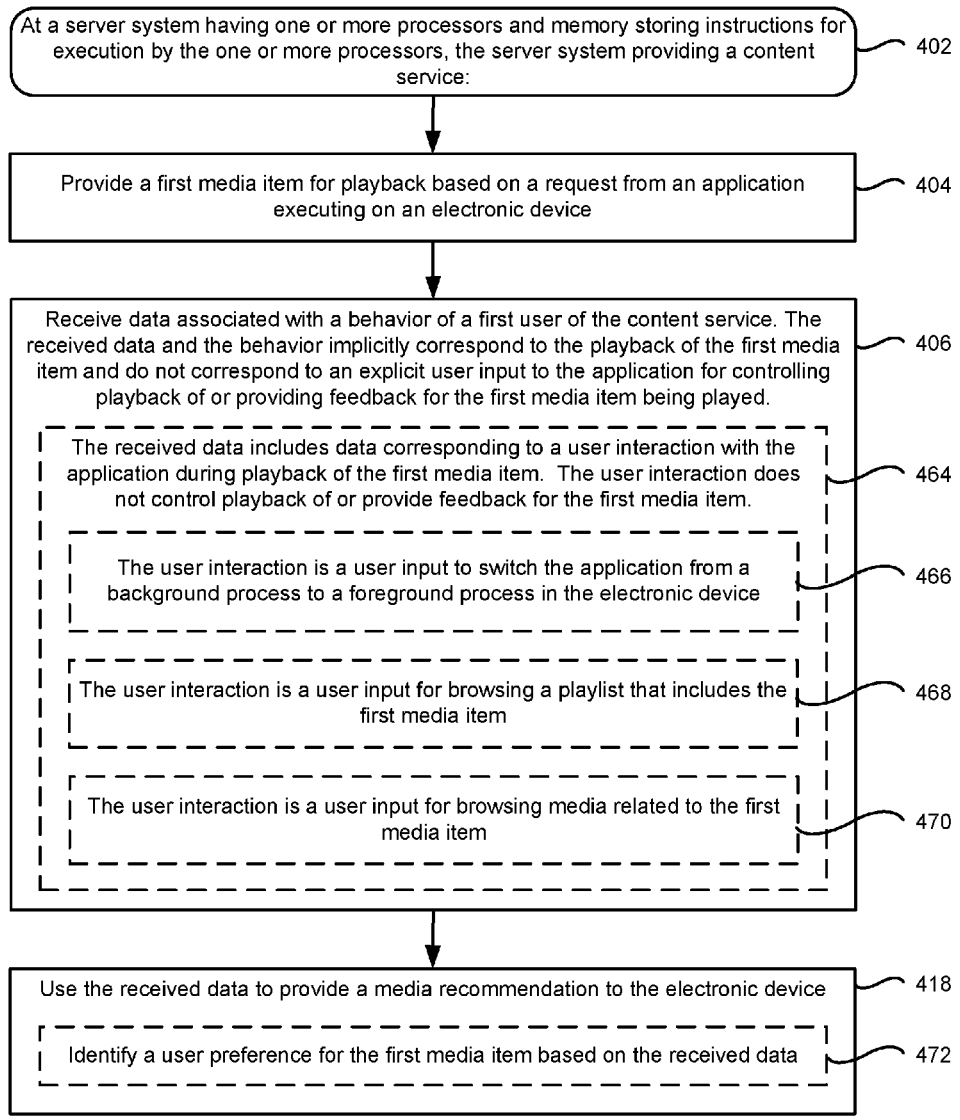

Referring now to FIG. 4G, in performing the method 400-D, a first media item is provided (404) for playback based on a request from an application executing on an electronic device (where providing the first media item for playback is performed in accordance with any of the implementations discussed with respect to any of the other methods 400-A through 400-D).

The server system receives (406) data associated with a behavior of a first user of the content service. Receiving (406) the data is performed in accordance with any of the implementations discussed with respect to any of the other methods 400-A through 400-D.

As described below, media recommendations (and sometimes a user preference with respect to a media item) are based on user interactions with the application that do not control playback of or provide feedback for the first media item.

In some implementations, the received data includes (464) data corresponding to a user interaction with the application during playback of the first media item (e.g., while playing a song). The user interaction does not control playback of or provide feedback for the first media item. For example, the user interaction is (466) a user input to switch the application from a background process to a foreground process in the electronic device (e.g., user input for switching from a web browser application 230 to the media application 222; user input for bringing the client device 102 out of a standby/locked state to access the media application 222; etc.). In another example, the user interaction is (468) a user input for browsing a playlist that includes the first media item (e.g., a touch gesture for scrolling through a playlist displayed by the media application 222). In another example, the user interaction is (470) a user input for browsing media related to the first media item (e.g., other media items of the same genre, artist, album, playlist, etc. as the media item being played).

The server system uses (418) the received data to provide a media recommendation to the electronic device (where providing the media recommendation is performed in accordance with any of the implementations discussed with respect to any of the other methods 400-A through 400-D).

In some implementations, using (418) the received data to provide the media recommendation includes identifying (472) a user preference for the first media item based on the received data (e.g., based on the user interaction), and generating the media recommendation in accordance with the user preference. As previously described, user preferences may be positive or negative (or neither) with respect to various aspects of a particular media item (e.g., musical characteristics of the media item, associated artists, associated albums/playlists, associated categories, and/or other associated properties of the media item).

As an example, if the user interaction is a user input to switch the application from a background process to a foreground process in the electronic device while a particular song is in playback (step 466), a positive user preference may be identified if the user switched to the media application 222 in order to view information about the song because the user enjoys the song or finds the song interesting. On the other hand, this same user interaction may indicate a negative user preference if the user switched to the media application 222 in order to play a different song, given the user's dislike of or lack of interest in the song being played. An explicit user input for controlling playback (e.g., for switching away from a media item) thus may negate the inference associated with user behavior implicitly corresponding to the playback (e.g., browsing behavior).

In another example, if the user interaction is a user input for browsing a playlist that includes a particular media item in playback (step 468), a positive user preference may be identified if the user is browsing an associated playlist in order to discover other related media items as a result of the user's interest. Alternatively, this same user interaction may indicate a negative user preference if the user ceases playback and plays a different media item, given the user's dislike of or lack of interest in the media item being played. Identification of this negative preference again shows that an explicit user input for controlling playback (e.g., for switching away from a media item) may negate the inference associated with user behavior implicitly corresponding to the playback (e.g., browsing behavior).

In yet another example, if the user interaction is a user input for browsing media related to the first media item (step 470), a positive user preference may be identified if the user is seeking to discover other related songs as a result of the user's interest (e.g., other songs by the same or similar artists).

In some implementations, the received data (406, FIGS. 4A, 4C, 4E, 4G) indicate movement of the electronic device associated with a rhythm of the first media item during playback of the first media item. Using (418, FIGS. 4B, 4D, 4F, 4G) the received data to provide the media recommendation includes identifying a positive user preference for the first media item based on the movement. For example, one or more sensors of the electronic device (e.g., gyroscope, accelerometer, etc. of client device 102, FIG. 2) may detect that a user is dancing to a song currently in playback. This suggests that a user has a positive opinion of the song, which the server system then uses to determine an appropriate media recommendation for providing to the user.

In some implementations, data associated with a behavior of the user is received while media is being played from a predefined playlist, or in a playback mode. Playlists or playback modes may be predefined and used for specific purposes (e.g., playlists/modes for playback while a user is sleeping or concentrating on a task). During these moments or in these modes, detected user behavior should not be a factor in providing media recommendations (e.g., idle behavior while a user sleeps should not be misconstrued as the user having a positive or negative user preference for the media being played). Thus, in some implementations, when the first media item is played back from a sleep-mode playlist (e.g., for playback while a user is sleeping), use of received data that implicitly corresponds to playback is disabled for providing (418, FIGS. 4B, 4D, 4F, 4G) the media recommendation (i.e., received data is ignored for the purposes of providing a media recommendation). In some implementations, when the playback is from a focus-mode playlist (e.g., for playback while a user concentrating on a task), use of received data that implicitly corresponds to playback is disabled for providing the media recommendation.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
   at a server system having one or more processors and memory storing instructions for execution by the one or more processors, the server system providing a content service:
   providing a first media item for playback based on a request from an application executing on an electronic device;
   receiving data associated with a behavior of a first user of the content service that indicates a transition of the electronic device from a first playback mode to a second playback mode distinct from the first playback mode, wherein:
   the transition occurs during playback of the first media item by the electronic device;
   the first playback mode corresponds to a playback mode in which audio is output through an audio jack of the electronic device to headphones; and
   the second playback mode corresponds to a playback mode in which audio is output through a speaker distinct from the headphones; and
   using the received data to provide a media recommendation to the electronic device, comprising:
   based on the received data, identifying a user preference for the first media item; and
   generating the media recommendation in accordance with the user preference.

2. The method of claim 1, wherein using the received data to provide the media recommendation further comprises:
   using the received data to determine a score for the first user with respect to the first media item; and
   generating the media recommendation based at least in part on the score.

3. The method of claim 1, wherein:
   the received data further indicates that the end of the first media item was reached within a predefined period of time before the transition.

4. The method of claim 1,
   the user preference is identified as being positive based on a determination that a playback count of the first media item for the user satisfies a threshold playback count.

5. The method of claim 1,
   the user preference is identified as being positive based on a determination that the first media item was played by the first user within a threshold period of time before the playback.

6. The method of claim 1, further comprising disabling use of the received data for providing the media recommendation, when the playback is for a sleep-mode playlist.

7. The method of claim 1, further comprising disabling use of the received data for providing the media recommendation, when the playback is for a focus-mode playlist.

8. The method of claim 1, further comprising using additional data corresponding to an explicit user input for controlling playback of or providing feedback for a media item to provide the media recommendation.

9. A server system providing a content service, comprising:
   one or more processors; and
   memory storing one or more programs for execution by the one or more processors, the one or more programs including instructions for:
   providing a first media item for playback based on a request from an application executing on an electronic device;
   receiving data associated with a behavior of a first user of the content service that indicates a transition of the electronic device from a first playback mode to a second playback mode distinct from the first playback mode, wherein:
   the transition occurs during playback of the first media item by the electronic device;
   the first playback mode corresponds to a playback mode in which audio is output through an audio jack of the electronic device to headphones; and
   the second playback mode corresponds to a playback mode in which audio is output through a speaker distinct from the headphones; and
   using the received data to provide a media recommendation to the electronic device, comprising:
   based on the received data, identifying a user preference for the first media item; and
   generating the media recommendation in accordance with the user preference.

10. A non-transitory computer-readable storage medium, storing one or more programs for execution by one or more processors of a server system that provides a content service, the one or more programs including instructions for:

providing a first media item for playback based on a request from an application executing on an electronic device;
receiving data associated with a behavior of a first user of the content service that indicates a transition of the electronic device from a first playback mode to a second playback mode distinct from the first playback mode, wherein:
the transition occurs during playback of the first media item by the electronic device;
the first playback mode corresponds to a playback mode in which audio is output through an audio jack of the electronic device to headphones; and
the second playback mode corresponds to a playback mode in which audio is output through a speaker distinct from the headphones; and
using the received data to provide a media recommendation to the electronic device, comprising:
based on the received data, identifying a user preference for the first media item; and
generating the media recommendation in accordance with the user preference.

* * * * *